US007465078B2

(12) United States Patent
Chang

(10) Patent No.: US 7,465,078 B2
(45) Date of Patent: Dec. 16, 2008

(54) HEAT-DISSIPATING HEAD-MOUNTED LED LAMP

(75) Inventor: Byung Jin Chang, Ann Arbor, MI (US)

(73) Assignee: General Scientific Corporation, Ann Arbor, MI (US)

( * ) Notice: Subject to any disclaimer, the term of this patent is extended or adjusted under 35 U.S.C. 154(b) by 0 days.

(21) Appl. No.: 11/555,534

(22) Filed: Nov. 1, 2006

(65) Prior Publication Data

US 2008/0101081 A1 May 1, 2008

(51) Int. Cl.
*B60Q 1/06* (2006.01)

(52) U.S. Cl. ........................ 362/373; 362/106; 362/547

(58) Field of Classification Search ................. 362/103, 362/105, 106, 373, 294
See application file for complete search history.

(56) References Cited

U.S. PATENT DOCUMENTS 5,621,922 A 4/1997 Rush, III
6,039,461 A * 3/2000 Cummings et al. .......... 362/287
6,604,847 B2 8/2003 Lehrer
6,612,695 B2 9/2003 Waters
6,623,141 B2 9/2003 Lehrer
6,659,618 B2 12/2003 Waters
6,764,194 B1 7/2004 Cooper
6,863,416 B2 3/2005 Waters
6,896,389 B1 5/2005 Paul
6,908,208 B1 * 6/2005 Hyde et al. ................. 362/105
6,955,444 B2 10/2005 Gupta
7,008,074 B1 3/2006 Halm
7,086,749 B1 8/2006 Hanley
7,134,763 B2 11/2006 Klootz
7,192,151 B2 3/2007 Clupper et al.
7,210,810 B1 5/2007 Iversen et al.

* cited by examiner

*Primary Examiner*—Ali Alavi
(74) *Attorney, Agent, or Firm*—Gifford, Krass, Sprinkle, Anderson & Citkowski, P.C.

(57) ABSTRACT

A heat-dissipating headlamp assembly comprises a housing including a light source such as a light-emitting diode (LED) disposed therein, and a detachable heat shroud covering the rearward portion of the housing. In the preferred embodiment the housing includes a pair of opposing detents, and the detachable heat shroud includes a pair of opposing protrusions that cooperate with the detents to hold the shroud in position. The assembly further includes a mounting bracket extending downwardly from the rearward portion for attachment to a headband, spectacle frames, or other head-worn item, and the heat shroud includes an upper rearward notch to accommodate the electrical cable connected to the light source and a lower rearward notch to accommodate the mounting bracket. The heat shroud is generally cylindrical in shape, and so, too, is the housing, at least where the heat shroud attaches thereto.

9 Claims, 4 Drawing Sheets

HEAT-DISSIPATING HEAD-MOUNTED LED LAMP

FIELD OF THE INVENTION

This invention relates generally to light sources of the type worn by doctors and dentists and, in particular, to a heat-dissipating lamp including a removable heat shroud.

BACKGROUND OF THE INVENTION

It is now common for medical and dental practitioners to wear head-mounted light sources, often in combination with magnifying loops or miniature video cameras. The source of light for such illuminators can either be remote, and brought to the headlamp via the optical fibers, the light source may be contained in the illuminator housing proper. In the latter case, given the higher intensities of modern light-emitting diodes and other sources, the housing can get quite hot to the touch. Accordingly, heat-dissipation and shrouding would be beneficial for such devices.

SUMMARY OF THE INVENTION

The present invention resides in a heat-dissipating headlamp assembly comprising a housing including a light source such as a light-emitting diode (LED) disposed therein, and a detachable heat shroud covering the rearward portion of the housing. In the preferred embodiment the housing includes a pair of opposing detents, and the detachable heat shroud includes a pair of opposing protrusions that cooperate with the detents to hold the shroud in position.

The assembly further includes a mounting bracket extending downwardly from the rearward portion for attachment to a headband, spectacle frames, or other head-worn item, and the heat shroud includes an upper rearward notch to accommodate the electrical cable connected to the light source and a lower rearward notch to accommodate the mounting bracket. The heat shroud is generally cylindrical in shape, and so, too, is the housing, at least where the heat shroud attaches thereto.

BRIEF DESCRIPTION OF TEE DRAWINGS

DETAILED DESCRIPTION OF THE INVENTION

Figure 1:
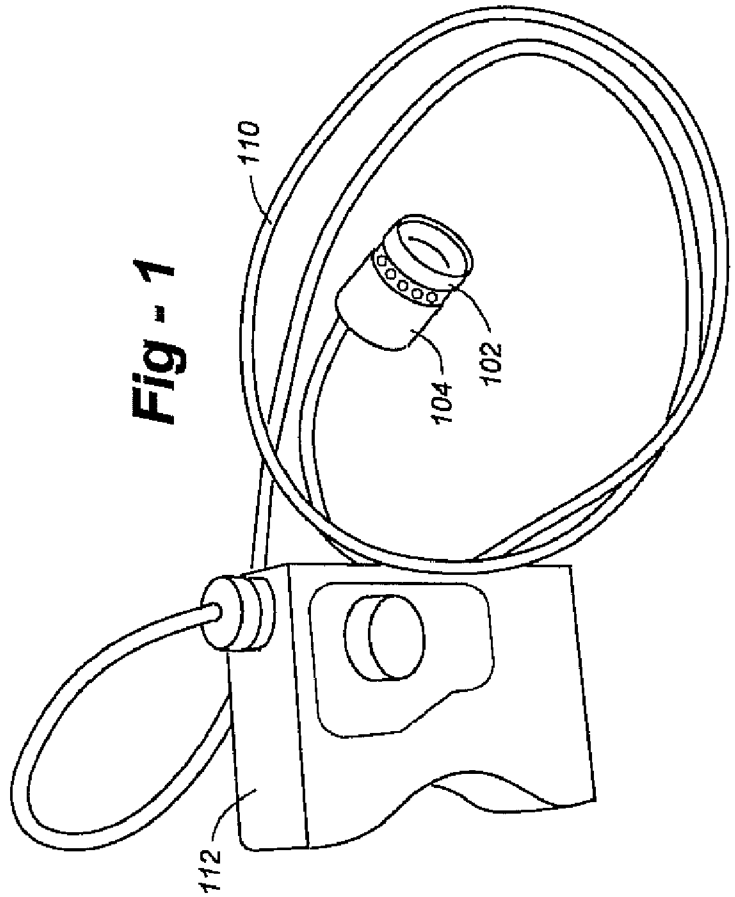
FIG. 1 is a drawing which shows a headlamp according to the invention interconnected to a source of power.

Returning now to the drawings, FIG. 1 is an oblique drawing showing a headlamp 102 with shroud 104 attached thereto. A cable 110 providing power from a source 112 interconnects to the housing 102, which contains a source of light, preferably a high-intensity light emitting diode (LED).

Figure 2:
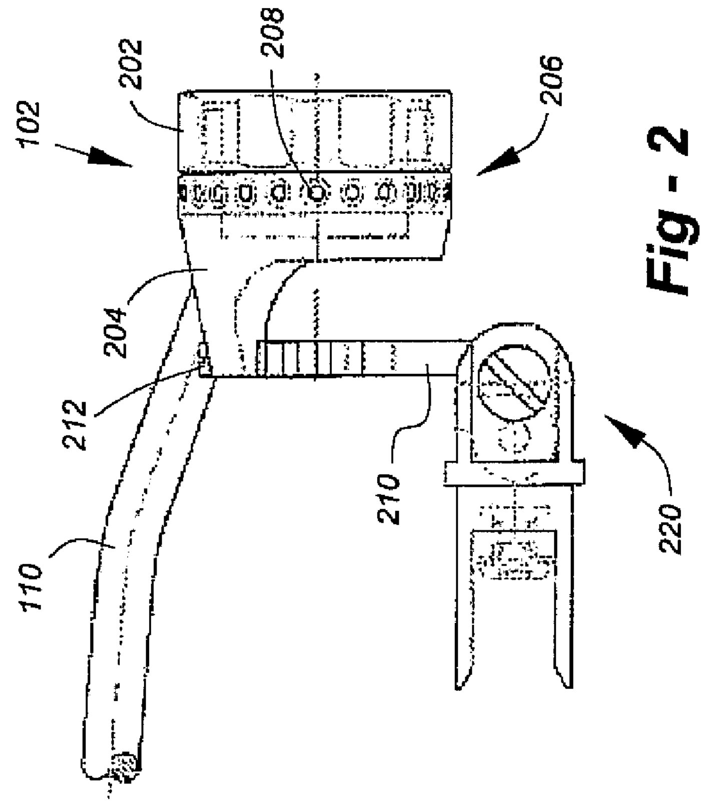
FIG. 2 is a side-view drawing showing the preferred embodiment with a mounting bracket and shroud removed.

FIG. 2 is a side-view drawing of one preferred embodiment, showing the housing generally at 102, including a forward portion 202 and a rearward portion 204. Between these forward and rearward portions is a generally cylindrical section having at least two opposing detents 208, one on the other side not shown in the drawing, to which the shroud clips in accordance with the principles described hereinbelow. The rearward portion is connected to a mounting bracket 210 using a screw 212 which, in turn, is coupled to a connector 220, allowing for mounting to eyeglass frames. Other types of mounts are not prevented by the invention, including headband mounts and attachments to other implements.

Figures 3A, 3B, 3C:
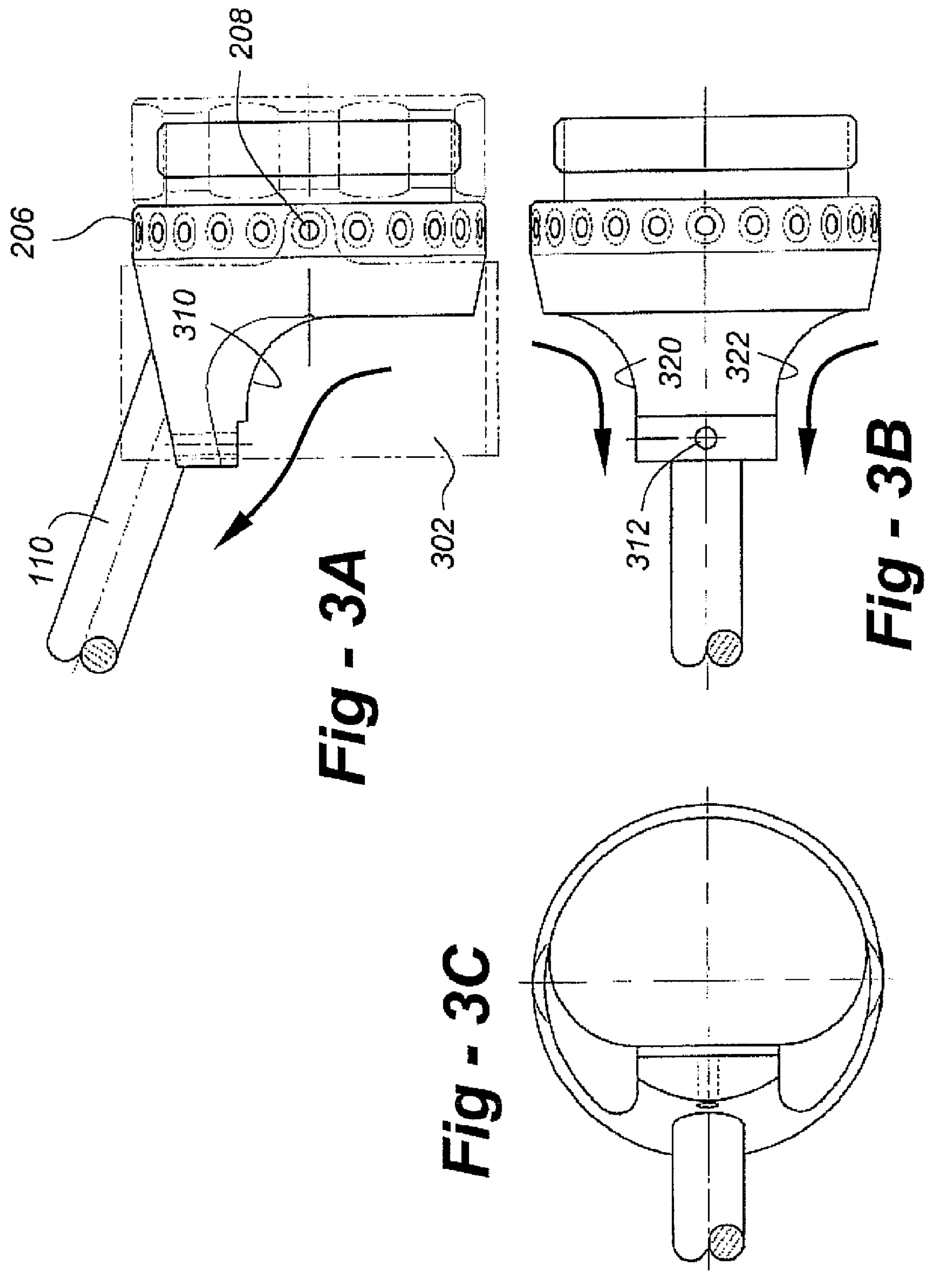
FIG. 3A is a side-view of the preferred embodiment, showing the head shroud in broken-line form.
FIG. 3B is a top-view of a housing according to the invention.
FIG. 3C is a back view of the housing.
Figure 3D:
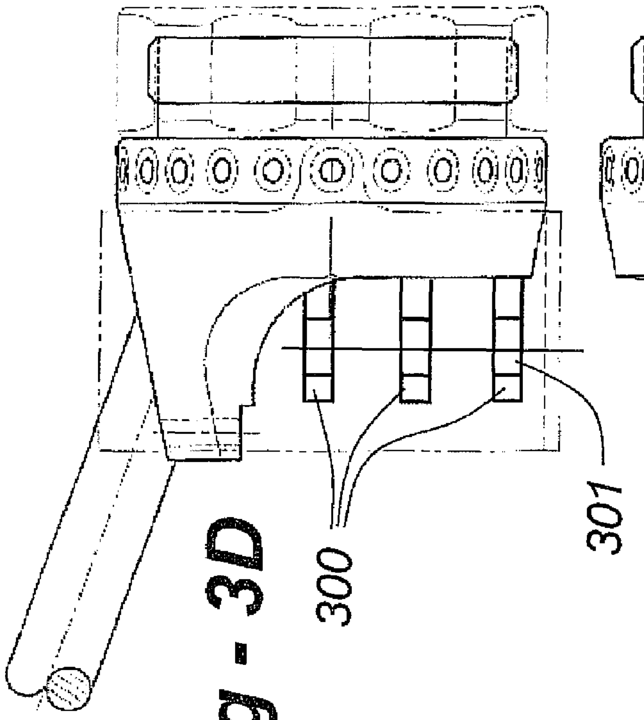
FIG. 3D is a side-view of an alternative embodiment, showing the use of optional heat-radiating, fins.

FIG. 3A is a side-view drawing of one preferred embodiment, showing the heat shroud in broken-line form at 302. This drawing also helps to illustrate the way in which heat convection flows upwardly and outwardly through the back of the heat shroud, which is open. The convection current is shown with the larger arrow. FIG. 3D is a top-view drawing showing the way in which the sides are cut out at 320, 322, also allowing for better cooling along the sides of the housing and out through the back of the shroud (not shown). FIG. 3C is a rear view of the housing, again, with the shroud removed.

Figure 3E:
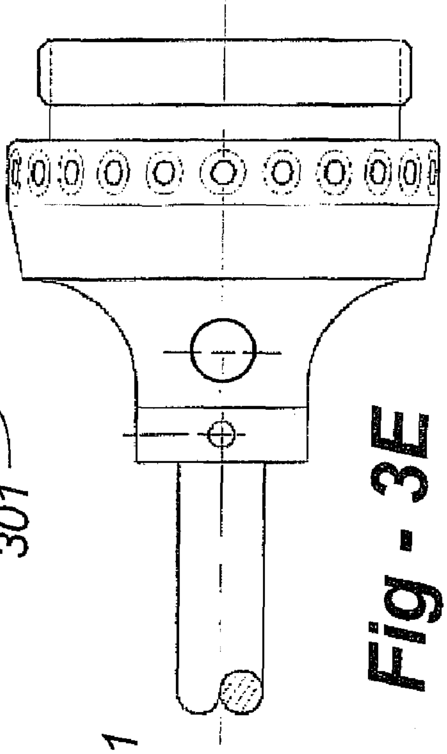
FIG. 3E is a top-view of the alternative housing.
Figure 3F:
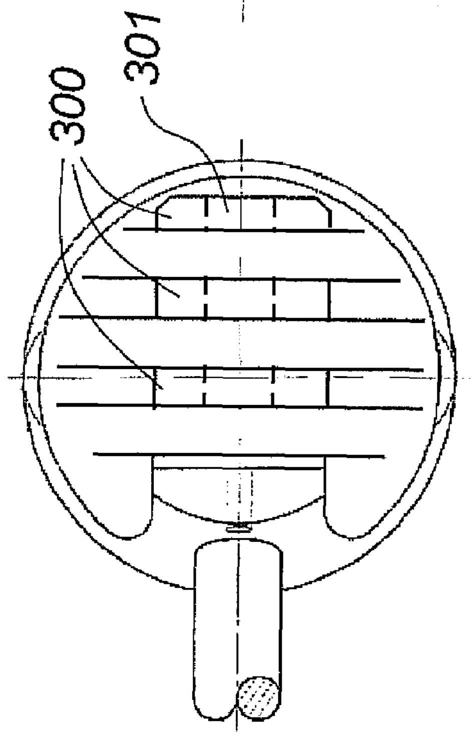
FIG. 3F is a back view of the alternative housing.

FIG. 3D is a side-view of an alternative embodiment, showing the use of optional heat-radiating fins 300. Aligned holes 301 may be provided for additional heat-radiating capability. FIG. 3E is a top-view of the alternative housing, and FIG. 3F is a back view of the alternative housing.

Figures 4A, 4B, 4C:
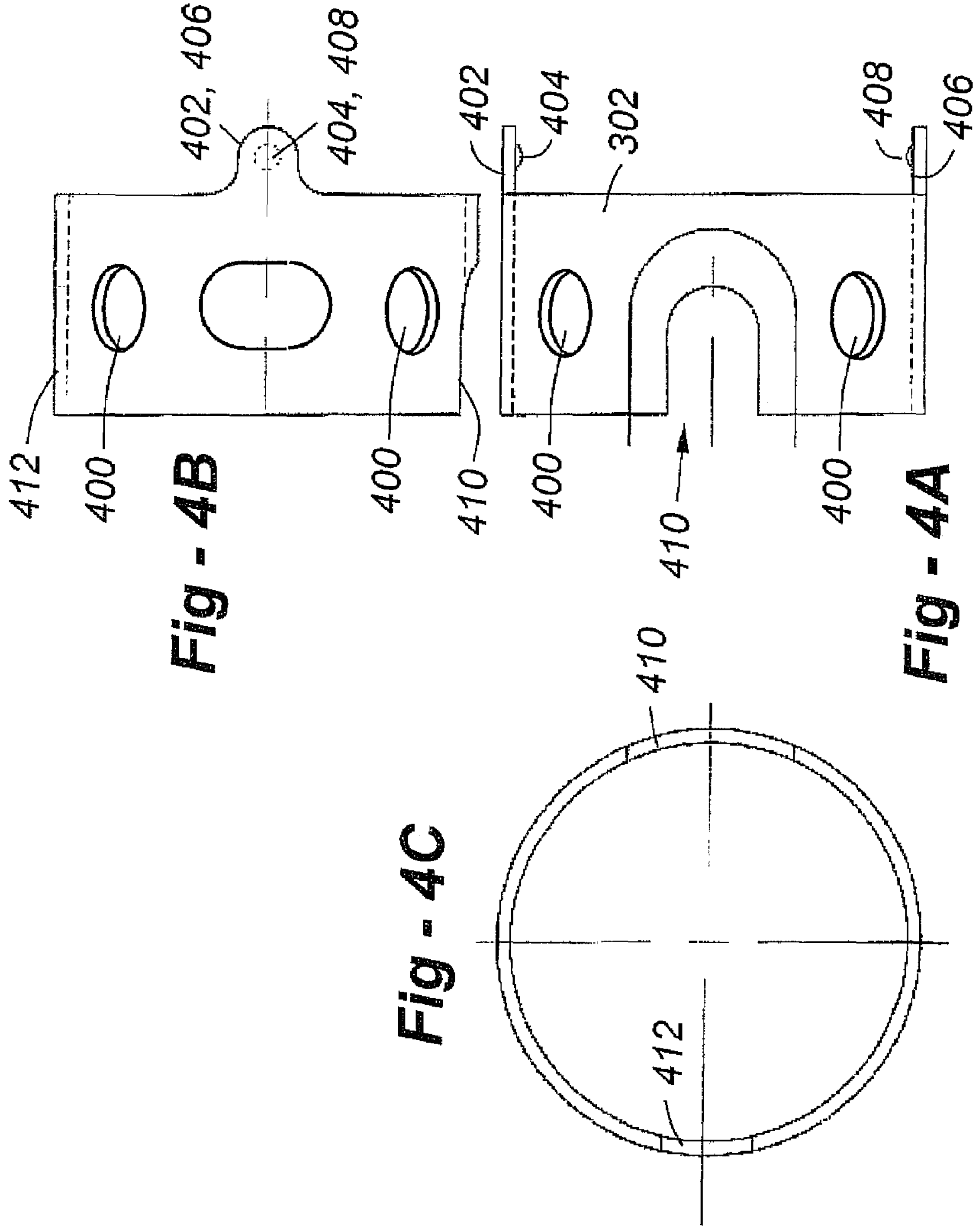
FIG. 4A is a top-view of the heat shroud according to the invention.
FIG. 4B is a side-view of the heat shroud.
FIG. 4C is a back view of the preferred heat shroud.

FIG. 4A is a top-view drawing of the preferred shroud according to the invention, including an upper cutaway 410 to accommodate the cable 110 and a lower cutaway 412 to accommodate the mounting bracket. Optional ports 400 may be provided for enhanced ventilation. In the forward portion of the shroud, are tabs 402, 406, from which projections 404, 408 extend. These projections are snapped into the openings 208 on the opposing sides of the housing, thereby holding the shroud in position. Although the preferred embodiment has detents on the housing and projections on the shroud, clearly these can be reversed. Indeed, other types of fasteners such as screws, set screws and so forth may be used to hold the shroud onto the housing. FIG. 4B is a side-view drawing of the shroud and FIG. 4C is a rear view of the shroud, showing that it is generally cylindrical, as is the housing, at least in the area where the shroud attaches thereto.

In terms of materials, the housing is preferably constructed from a machined metal such as aluminum, whereas the shroud is made of heat-tolerant plastic. Other materials may be used as long as they are able to withstand the working temperatures involved.

I claim:

1. A headlamp assembly, comprising:

a housing including a light source disposed therein;

the housing having a forward portion through which light from the source is emitted;

the housing further including a rearward portion through which an electrical cable to the light source extends; and a manually detachable, snap-on/snap-off heat shroud covering the rearward portion of the housing.

2. The headlamp of claim 1, wherein the light source is a light-emitting diode.

3. The headlamp of claim 1, wherein:

the housing includes a pair of opposing detents; and detachable heat shroud including a pair of opposing protrusions that cooperate with the detents to hold the shroud in position.

4. The headlamp of claim 1, wherein the heat shroud includes a rearward notch to accommodate the electrical cable.

5. The headlamp of claim 1, further including a mounting bracket extending downwardly from the rearward portion for attachment to a headband, spectacle frames, or other head-worn item.

6. The headlamp of claim 1, wherein the heat shroud includes a lower rearward notch to accommodate the mounting bracket.

7. The headlamp of claim 1, wherein:

the heat shroud has a rearward opening; and the rearward portion of the housing has a lower, curved cut-away causing heat to flow upwardly and back out of the heat shroud rearward opening.

8. The headlamp of claim 1, wherein the heat shroud is generally cylindrical in shape.

9. The headlamp of claim 1, wherein:

the heat shroud is generally cylindrical in shape; and the housing is generally cylindrical in shape at least where the heat shroud attaches thereto.

* * * * *